(12) United States Patent
Mogi et al.

(10) Patent No.: US 9,925,899 B2
(45) Date of Patent: Mar. 27, 2018

(54) SEAT PAD

(71) Applicants: Toyo Tire & Rubber Co., Ltd., Osaka-shi, Osaka (JP); TACHI-S CO., LTD., Akishima-shi, Tokyo (JP)

(72) Inventors: Manabu Mogi, Osaka (JP); Shogo Suzuki, Akishima (JP); Junpei Yoshikawa, Akishima (JP); Jun Takano, Akishima (JP)

(73) Assignees: TOYO TIRE & RUBBER CO., LTD., Itami-shi (JP); TACHI-S CO., LTD., Tokyo (JP)

( * ) Notice: Subject to any disclaimer, the term of this patent is extended or adjusted under 35 U.S.C. 154(b) by 40 days.

(21) Appl. No.: 14/434,228

(22) PCT Filed: Nov. 19, 2013

(86) PCT No.: PCT/JP2013/006779
§ 371 (c)(1),
(2) Date: Apr. 8, 2015

(87) PCT Pub. No.: WO2014/080614
PCT Pub. Date: May 30, 2014

(65) Prior Publication Data
US 2015/0274048 A1 Oct. 1, 2015

(30) Foreign Application Priority Data
Nov. 26, 2012 (JP) .................. 2012-257801

(51) Int. Cl.
*B60N 2/56* (2006.01)
*B60N 2/58* (2006.01)
(Continued)

(52) U.S. Cl.
CPC ........ *B60N 2/5664* (2013.01); *B29C 44/1233* (2013.01); *B29C 44/1261* (2013.01);
(Continued)

(58) Field of Classification Search
CPC ............................ B60N 2/5664; B60N 2/5825
(Continued)

(56) References Cited

U.S. PATENT DOCUMENTS 3,727,980 A * 4/1973 Tischler .................. A47C 7/20
297/452.53
6,302,487 B1 * 10/2001 Fujita .................. B60N 2/5825
297/452.56

(Continued)

FOREIGN PATENT DOCUMENTS

EP 1 389 558 A1 2/2004
JP 01-110914 A 4/1989
(Continued)

OTHER PUBLICATIONS

Office Action dated Dec. 1, 2015, issued in counterpart Japanese Patent Application No. 2012-257801, with English translation (5 pages).

(Continued)

*Primary Examiner* — Timothy J Brindley
(74) *Attorney, Agent, or Firm* — Westerman, Hattori, Daniels & Adrian, LLP

(57) ABSTRACT

There is provided a seat pad 10 including a pad body 12 formed of a foam resin molding and a breathable cushion body 14 formed of a three-dimensional net structure made of linear bodies and provided in a pad surface side of the pad body 12. In the pad body 12, pulling-in grooves 22, 24 for pulling in a skin material 20 are provided on a pad surface, wires 26 are embedded along the pulling-in grooves, and locking holes 28 exposing part of the wires 26 are provided. The locking holes 28 are provided so as to pierce the pad to a pad reverse side and the breathable cushion body 14 is provided in a state where side surfaces thereof abut on the pulling-in grooves 22, 24 so as to communicate thereto.

2 Claims, 6 Drawing Sheets

(51) Int. Cl.
  *B60N 2/70* (2006.01)
  *B60N 2/64* (2006.01)
  *B29C 44/12* (2006.01)
  *B29L 31/58* (2006.01)
  *B29K 75/00* (2006.01)

(52) U.S. Cl.
  CPC ......... *B60N 2/5642* (2013.01); *B60N 2/5825* (2013.01); *B60N 2/646* (2013.01); *B60N 2/7017* (2013.01); *B29K 2075/00* (2013.01); *B29L 2031/58* (2013.01)

(58) Field of Classification Search
  USPC ............................ 297/452.6, 452.22, 452.26
  See application file for complete search history.

(56) References Cited

U.S. PATENT DOCUMENTS

| | | | | |
|---|---|---|---|---|
| 6,386,577 | B1* | 5/2002 | Kan ...................... | B60R 21/207 280/728.1 |
| 8,974,004 | B2* | 3/2015 | Sakamoto ................ | B60N 2/64 297/218.1 |
| 2004/0104607 | A1 | 6/2004 | Minegishi et al. | |
| 2004/0107713 | A1* | 6/2004 | Aoki ................... | B60H 1/00064 62/208 |
| 2006/0163850 | A1* | 7/2006 | Inazu .................... | B60N 2/5825 280/730.2 |
| 2006/0214485 | A1* | 9/2006 | Brockschnieder ..... | B60N 2/449 297/228.11 |
| 2008/0054702 | A1* | 3/2008 | Ali .......................... | B68G 7/00 297/452.26 |
| 2009/0033131 | A1* | 2/2009 | Clauser ................. | B68G 7/052 297/218.4 |
| 2009/0079236 | A1 | 3/2009 | Itou et al. | |
| 2009/0146483 | A1* | 6/2009 | Niwa ................... | B60N 2/5891 297/452.61 |
| 2012/0306256 | A1* | 12/2012 | Okuyama ............ | B60N 2/5825 297/452.6 |
| 2013/0264857 | A1* | 10/2013 | Ota ....................... | B60N 2/5657 297/452.47 |
| 2014/0077550 | A1* | 3/2014 | Makiguchi ............... | B60N 2/02 297/284.11 |
| 2014/0183846 | A1* | 7/2014 | Fujiwara ............... | B60R 21/207 280/729 |
| 2015/0158405 | A1* | 6/2015 | Miyata ................... | A47C 27/14 297/180.1 |
| 2015/0165947 | A1* | 6/2015 | Clauser ................ | B60N 2/5825 297/452.18 |
| 2015/0328808 | A1* | 11/2015 | Sasaki ................. | B29C 44/1271 264/46.4 |
| 2016/0052435 | A1* | 2/2016 | Nakada .................. | B60N 2/646 297/452.48 |
| 2016/0107551 | A1* | 4/2016 | Nii ........................... | B60N 2/70 297/180.13 |
| 2016/0129818 | A1* | 5/2016 | Sahashi .................... | B60N 2/70 297/452.61 |
| 2016/0144756 | A1* | 5/2016 | Ito ........................ | B60N 2/7094 297/452.49 |

FOREIGN PATENT DOCUMENTS

| | | |
|---|---|---|
| JP | 01-104247 U | 7/1989 |
| JP | 2009-077760 A | 4/2009 |
| JP | 2012-115515 A | 6/2012 |

OTHER PUBLICATIONS

Office Action dated Dec. 4, 2015, issued in counterpart Chinese Patent Application No. 201380045439.x, with English translation (9 pages).

International Search Report dated Jan. 7, 2014, issued in corresponding application No. PCT/JP2013/006779.

Office Action dated Jul. 27, 2017, issued in counterpart German Application No. 11 2013 005 643.7, with English translation. (10 pages).

* cited by examiner

SEAT PAD

TECHNICAL FIELD

The present invention relates to a seat pad capable of being used for seats of various kinds of vehicles such as cars and railway trains as well as seats of boats and aircraft.

BACKGROUND ART

In vehicle seats including car seats, there is proposed a technique in which a cushion body formed of a three-dimensional net structure made of linear bodies is set in a part of a pad body made of polyurethane foam for reducing stuffiness when seated (for example, refer to PTL 1). As the cushion body formed of the three-dimensional net structure has an excellent breathability as compared with polyurethane foam forming the pad body, the breathability of the seat can be improved.

For example, there is provided a structure in which the cushion body formed of the three-dimensional net structure is arranged at a part under thighs in the pad surface side in a seating part of the pad body made of polyurethane foam, and a vent hole is provided in the pad body positioned at a lower side of the cushion body in PTL 1.

CITATION LIST

Patent Literature

PTL 1: JP-A-2012-115515 (kokai)

SUMMARY OF INVENTION

Technical Problem

In a seat pad in which the cushion body formed of the three-dimensional net structure is arranged at, for example, the part under thighs, it is desirable that the pad body made of polyurethane foam is provided in a reverse side of the cushion body for obtaining durability required for the seat also in a portion where the cushion body is arranged. Then, the structure in which the vent hole is provided in the pad body positioned at the lower side of the cushion body as disclosed in PTL 1 will be effective for improving the breathability in the cushion body. However, the vent hole in the pad body is arranged so as to be aligned in a position where a load from a seated person is inputted in the structure disclosed in PTL 1, and it is undeniable that the durability is reduced at the portion where the load from the seated person is received only by the cushion body. Accordingly, it is difficult to achieve both improvement of breathability and improvement of durability.

The present invention has been made in view of the above, and an object thereof is to achieve both improvement of breathability and improvement of durability in the seat pad in which the cushion body formed of the three-dimensional net structure is provided on the pad surface side.

Solution to Problem

A seat pad according to the present invention includes a pad body formed of a foam resin molding and a breathable cushion body formed of a three-dimensional net structure made of linear bodies and provided in a pad surface side of the pad body. The pad body has a pulling-in groove provided on the pad surface for pulling in a skin material, a wire embedded along the pulling-in groove, and a locking hole provided in the pulling-in groove and exposing a part of the wire. The locking hole is provided so as to pierce the pad body to a pad reverse side as well as the breathable cushion body is provided so that a side surface thereof abuts on the pulling-in groove so as to communicate thereto.

Advantageous Effects of Invention

According to the present invention, it is possible to improve the breathability without reducing the durability required for the seat by using the locking hole for pulling in and locking the skin material as a vent hole. That is, the breathable cushion body provided in the pad surface side is provided in a state where a side surface thereof abuts on the pulling-in groove so as to communicate thereto as well as the locking hole in the pulling-in groove is provided so as to pierce the pad body to the pad reverse side in the present invention. Accordingly, air can go in and out of the breathable cushion body from the pad reverse side through the locking hole as a vent hole by using the pulling-in groove as a conduit. Therefore, it is possible to improve the breathability and to reduce the stuffiness for a human body without reducing the durability.

DESCRIPTION OF EMBODIMENTS

Figure 1:
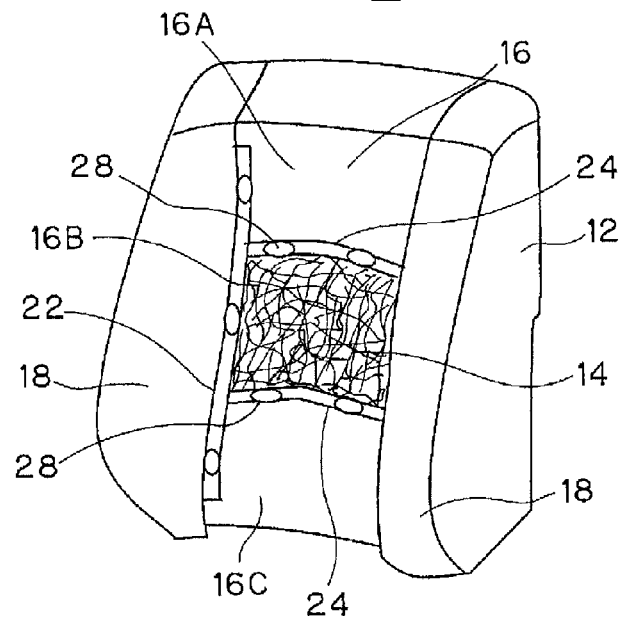
FIG. 1 is a perspective view of a seat pad according to a first embodiment.
Figure 2:
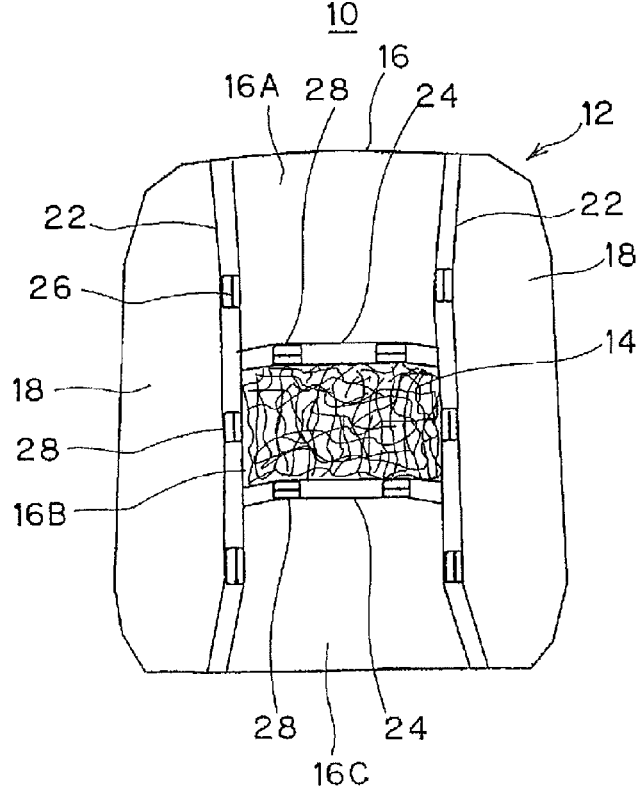
FIG. 2 is a front view of the seat pad.

Hereinafter, embodiments of the present invention will be explained with reference to the drawings.

First Embodiment

A seat pad 10 according to a first embodiment will be explained with reference to FIG. 1 to FIG. 7. The seat pad 10 is, for example, a back pad forming a backrest part of a car seat. The seat pad 10 includes a pad body 12 made of a foam molding of soft polyurethane foam and a breathable cushion body 14 formed of a three-dimensional net structure.

The seat pad 10 includes a main part 16 formed in a center part in a width direction for receiving a back of an occupant and a pair of right and left side parts 18, 18 formed so as to protrude at both sides of the main part 16 in the width direction. The main part 16 is vertically divided into three sections, which includes an upper section 16A, an intermediate section 16B and a lower section 16C in the embodiment. A flange part 19 inwardly protruding for attaching a not-shown frame is integrally provided on a reverse side of the sheet pad 10.

The pad body 12 is provided with pulling-in grooves 22, 24 for locking a skin material (namely, a seat cover) 20 on the pad surface (namely, the front of the seat pad 10). In this example, there are provided a pair of right and left vertical pulling-in grooves 22, 22 extending in a vertical direction and upper and lower two horizontal pulling-in grooves 24, 24 extending across a portion between the vertical pulling-in grooves 22, 22 in the width direction. Portions outside the pair of vertical pulling-in grooves 22, 22 in the width direction correspond to the side parts 18, 18 and a portion therebetween correspond to the main part 16. The main part 16 is divided into the upper section 16A, the intermediate section 16B and the lower section 16C by the horizontal pulling-in grooves 24.

In the pad body 12, wires (also referred to as pulling-in wires) 26 for fixing the skin material 20 are embedded along longitudinal directions of these pulling-in grooves 22, 24. The wires 26 are embedded in a bottom side (namely, a lower side of the grooves) in respective pulling-in grooves 22, 24, which are provided over approximately the entire length of the pulling-in grooves 22, 24.

In the pad body 12, locking holes 28 for exposing part of the wires 26 in the longitudinal direction are formed for pulling in and locking the skin material 20. The locking holes 28 are provided at one or plural places in the longitudinal directions of respective pulling-in grooves 22, 24, and the wires 26 are exposed at these places inside the pulling-in grooves 22, 24. That is, the wires 26 are exposed intermittently in the locking holes 28. Therefore, the skin material 20 can be fixed by pulling the skin material 20 into the pulling-in grooves 22, 24 and locking the skin material 20 to the exposed wires 26 by using not-shown locking metal fittings (see FIG. 5).

Figure 3:
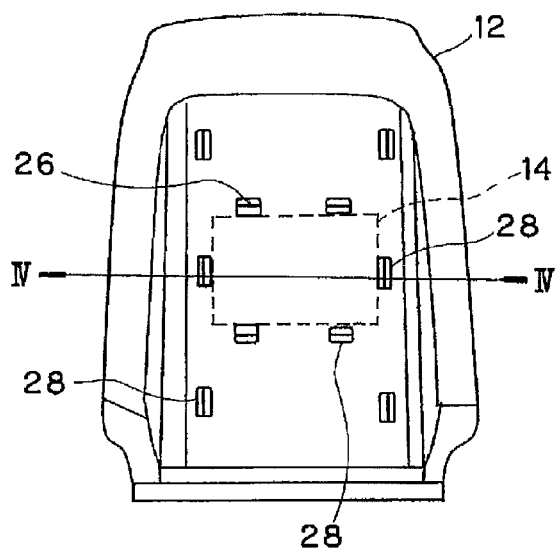
FIG. 3 is a rear view of the seat pad.
Figure 4:
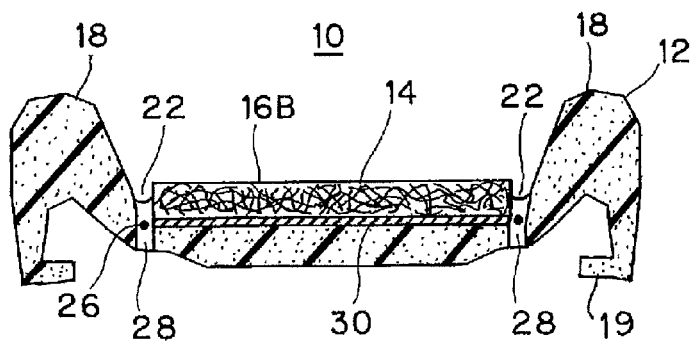
FIG. 4 is a cross-sectional view taken along IV-IV line of FIG. 3.
Figure 5:
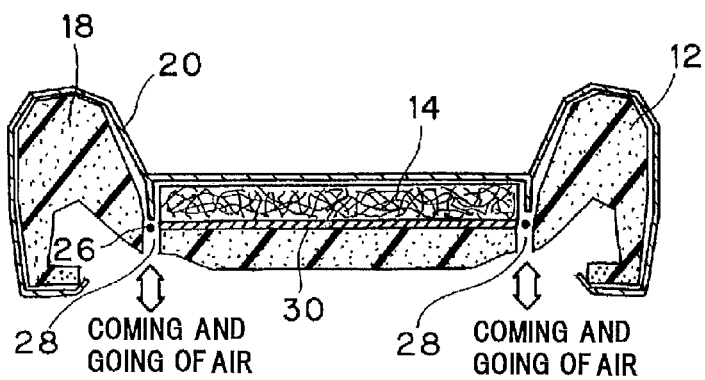
FIG. 5 is a cross-sectional view of the above in a state of being covered with a skin material.

The locking holes 28 are provided so as to pierce the pad body 12 to the reverse side as shown in FIG. 3 and FIG. 4. That is, the locking holes 28 are provided as through holes piercing the pad body 12 in the pulling-in grooves 22, 24, and the wires 26 are exposed inside the through holes.

The breathable cushion body 14 is formed of a three-dimensional net structure made of linear bodies, having cushioning properties and having an excellent breathability as compared with soft polyurethane foam which forms the pad body 12. As the breathable cushion body 14, for example, hard cotton (stiff cotton), a three-dimensional random loop connection structure and so on can be cited. The hard cotton is obtained by, for example, using synthetic fibers such as polyester fibers, mixing fibers having a relatively high melting point with fibers having a low melting point, and integrally molding the fibers by using the low-melting point fibers as a binder. The three-dimensional random loop connection structure is formed by bending continuous linear bodies made of thermoplastic elastic resin to form random loops, bonding respective loops to one another in a molten state and fuse-bonding major part of contact portions, which is represented by, for example, "BREATHAIR" (registered trademark) manufactured by TOYOBO CO., LTD. These are three-dimensional net structures formed of a fiber member (linear bodies), which have an excellent breathability as the density thereof is low, which is 20 to 200 kg/m$^3$.

The breathable cushion body 14 is laminated on and integrally formed with part of the pad surface side in the pad body 12 as shown in FIG. 1 to FIG. 4. The breathable cushion body 14 is provided so that side surfaces thereof abuts on the pulling-in grooves 22, 24 so as to communicate thereto. Specifically, the breathable cushion body 14 is arranged in an area demarcated by the pulling-in grooves 22, 24. The side surface in at least one side of the periphery of the breathable cushion body 14 is provided along the pulling-in grooves 22, 24 in a state where the side surface abuts on the pulling-in grooves 22, 24 so as to communicate thereto.

In this example, the breathable cushion body 14 is laminated on and integrally formed with the pad surface side in the intermediate section 16B of the main part 16, and the entire surface part of the intermediate section 16B is formed of the breathable cushion body 14. Accordingly, the breathable cushion body 14 having an approximately rectangular shape is formed so that the entire periphery (namely, four sides) abut on the pair of right and left vertical pulling-in grooves 22, 22 and the pair of upper and lower horizontal pulling-in grooves 24, 24 and is surrounded by these grooves.

As shown in FIG. 4, an infiltration suppression sheet 30 is provided in the reverse side of the breathable cushion body 14 as well as on a boundary surface between the breathable cushion body 14 and the pad body 12. The infiltration suppression sheet 30 suppresses the infiltration of a foam raw material into the breathable cushion body 14 at the time of foam molding of the pad body 12. As the infiltration suppression sheet 30, for example, a film made of synthetic resin, a non-woven fabric and so on can be used.

Note that a reinforcing fabric made of a non-woven fabric and so on can be laminated on and integrally formed with the reverse side of the pad, namely, a back surface of the seat pad 10, though not shown. In that case, through holes are also provided at corresponding positions in the reinforcing fabric so that the locking holes 28 pierce the pad to the reverse side.

The sheet pad 10 according to the embodiment is formed so that the breathable cushion body 14 is laminated on and integrally formed with the pad surface side by foam molding of the pad body 12.

Figure 7:
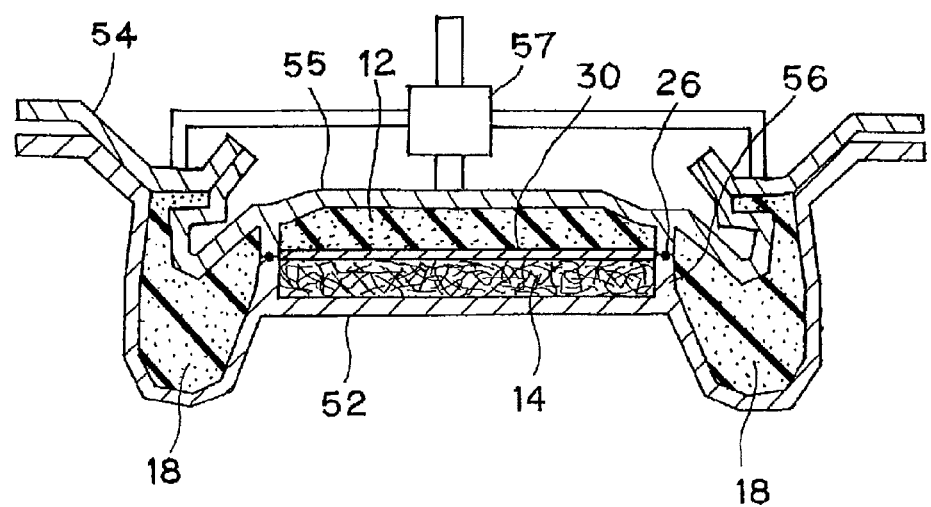
FIG. 7 is a cross-sectional view in a stage where foam molding is performed in the first embodiment.

In the foam molding of the pad body 12, a foaming mold 50 including a lower mold 52 opening upward for forming the pad surface (front) side and an upper mold 54 for forming the pad reverse side (back surface) side is used as shown in FIG. 7. The upper mold 54 is provided so as to rotate with respect to the lower mold 52 through a not-shown hinge, which is formed so as to form a cavity as a foam space corresponding to a pad shape together with the lower mold 52 by opening/closing the upper surface opening of the lower mold 52.

In the example, the upper mold 54 has a core mold 55 for forming the flange part 19. Accordingly, major part of the pad reverse side is formed by the core mold 55, and the periphery thereof is formed by a main body portion of the upper mold 54. The core mold 55 is formed so as to be attached/detached to and from the main body portion of the upper mold 54 by a drive device 57 provided in the upper mold 54, which is disengaged from the upper mold 54 by driving the drive device 57 in a state where the upper mold 54 is opened, and the mold is opened.

Figure 6:
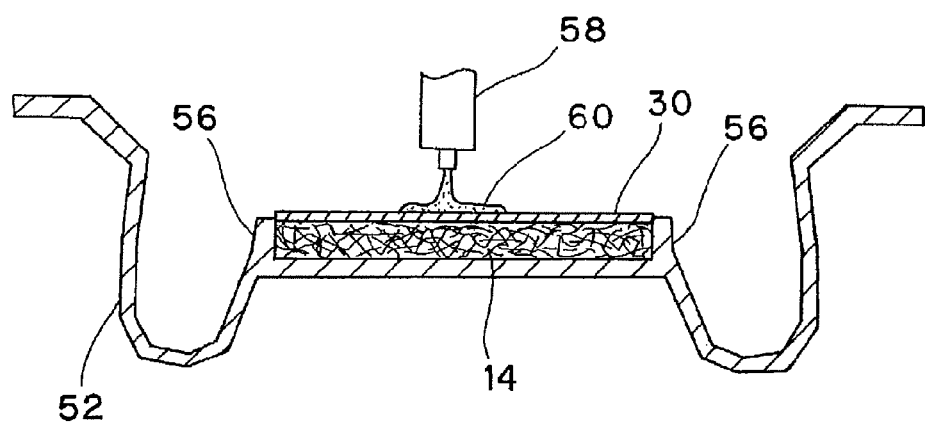
FIG. 6 is a cross-sectional view at the time of injecting a foam raw material in the first embodiment.

As shown in FIG. 6, protruding ridges 56 for forming the pulling-in grooves 22, 24 are formed in a protruding manner in the lower mold 52. Then, respective areas for forming the right and left side parts 18, 18, the upper section 16A, the intermediate section 16B and the lower section 16C in the main part 16 between the side parts 18, 18 are demarcated by the protruding ridges 56.

When the seat pad 10 is manufactured by using the foaming mold 50, the breathable cushion body 14 is attached to the lower mold 52 as shown in FIG. 6. At that time, the breathable cushion body 14 is set so as to be fitted into the frame of the protruding ridges 56 so as to be in a state where the periphery is surrounded by the protruding ridges 56 which demarcate the intermediate section 16B. The infiltration suppression sheet 30 is bonded to one side of the breathable cushion body 14 which has a thick plate shape, and the breathable cushion body 14 is attached to the lower mold 52 so that the infiltration suppression sheet 30 faces upward. The reinforcing fabric is attached to the upper mold 54, specifically, to the core mold 55, and further, the wires 26 are set, though not shown.

Subsequently, as shown in FIG. 6, a foam raw material (urethane foam raw liquid) 60 is poured into the lower mold 52 by using a pouring device 58. At that time, the infiltration suppression sheet 30 covers an upper surface of the breathable cushion body 14, therefore, the foam raw material 60 is not infiltrated into the three-dimensional net structure of the breathable cushion body 14 even when the foam raw material 60 is directly poured into the upper surface.

When the mold is closed by closing the upper mold 54 after pouring the foam raw material 60, the foam raw material 60 is filled in the cavity of the foaming mold 50 while foaming. Accordingly, the breathable cushion body 14 is laminated on and integrally formed with the pad body 12 as shown in FIG. 7. After the foam molding in the above manner, demolding is performed by opening the upper mold 54, then, the core mold 54, thereby obtaining the seat pad 10.

According to the embodiment as described above, the breathable cushion body 14 is provided in a state of abutting on the pulling-in grooves 22, 24 so as to communicate thereto, and the pulling-in grooves 22, 24 are provided so as to pierce the pad body 12 at the locking holes 28. Accordingly, the locking holes 28 can be used as vent holes as well as the pulling-in grooves 22, 24 can be used as air conduits connecting the vent holes and the breathable cushion body 14. That is, air can go in and out of the breathable cushion body 14 through the locking holes 28 by using the pulling-in grooves 22, 24 as the conduits (see FIG. 5), the breathability of the seat pad 10 can be improved and the stuffiness when seated can be reduced effectively.

Also according to the embodiment, the pulling-in grooves 22, 24 and the locking holes 28 for locking the skin material 20 are used for improving the breathability of the breathable cushion body 14 provided on the pad surface side, and a vent hole is not provided in the pad body portion supporting the reverse side of the breathable cushion body 14. That is, the breathable cushion body 14 is provided in a state where the side surfaces, not the reverse surface, abut on the pulling-in grooves 22, 24 so as to communicate thereto to form air flow paths. Accordingly, it is possible to prevent the reduction of durability of the pad body 12 caused by providing a vent hole in the support portion. It is also possible to suppress the effect on seating comfortableness caused by providing a vent hole in the support portion. Therefore, the breathability can be improved without reducing the durability required for the seat while suppressing the effect on the seating comfortableness. Furthermore, as vent holes can be formed by allowing the originally existing locking holes 28 to pierce the pad body 12, the foam molding of the pad body 12 can be easily realized.

Further according to the embodiment, the breathable cushion body 14 is provided along the pulling-in grooves 22, 24 in a state where the periphery thereof abuts on the pulling-in grooves 22, 24 so as to communicate thereto while the breathable cushion body 14 is arranged in the area sectioned by the pulling-in grooves 22, 24. Accordingly, the air from the periphery of the breathable cushion body 14 to the pulling-in grooves 22, 24 as the conduits smoothly flows and the breathability can be improved.

Also according to the embodiment, the infiltration suppression sheet 30 is provided in the breathable cushion body 14 formed of the three-dimensional net structure, therefore, it is possible to prevent infiltration of the foam raw material 60 into the breathable cushion body 14 at the time of foam molding of the pad body 12. That is, it is possible to prevent the liquid-state foam raw material 60 in a stage of initial reaction from infiltrating into the breathable cushion body 14, therefore, problems that a boundary portion becomes hard and that the breathability is reduced due to the foam infiltrated can be solved.

In the above embodiment, the infiltration suppression sheet 30 is adhered to the breathable cushion body 14 in advance, and the breathable cushion body 14 in that state is set in the lower mold 52. Alternatively, it is also preferable that the breathable cushion body 14 is set in the lower mold 52, then, the infiltration suppression sheet 30 covers the upper surface of the breathable cushion body 14.

Second Embodiment

Figure 8:
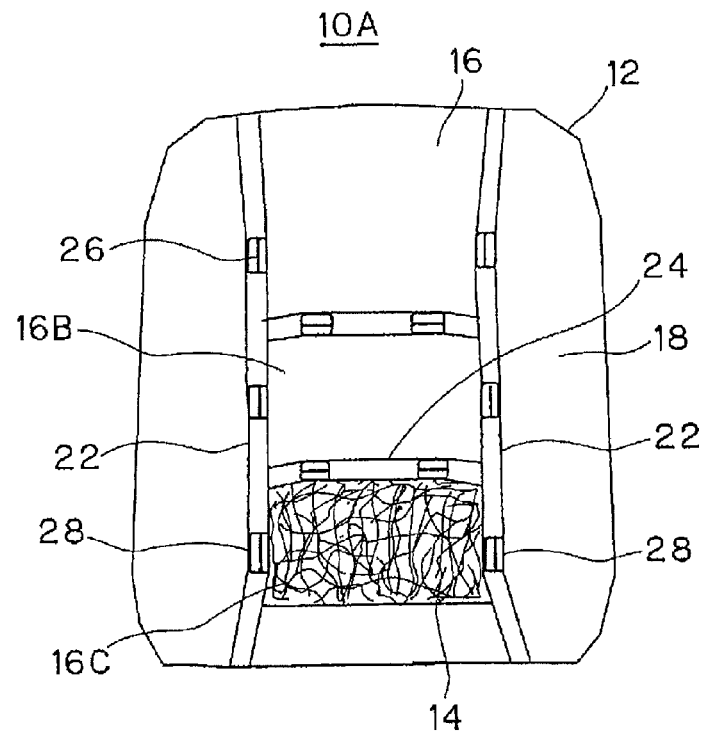
FIG. 8 is a front view of a seat pad according to a second embodiment.

FIG. 8 shows a seat pad 10A according to a second embodiment. This embodiment differs from the first embodiment in a point that the breathable cushion body 14 is provided in the lower section 16C of the main part 16 instead of being provided in the intermediate section 16B of the main part 16.

That is, the breathable cushion body 14 is provided in the lower section 16C of the main part 16, specifically, provided in a surface part of the lower section 16C other than a lower end part. The breathable cushion body 14 has an approximately rectangular shape, and is provided along the pulling-in grooves 22, 24 in a state where three sides of the periphery, which are an upper side and right and left both sides, abut on the pair of right and left vertical pulling-in grooves 22, 22 and the one horizontal pulling-in groove 24 in the lower side so as to communicate thereto over the entire length. That is, the breathable cushion body 14 is formed so that three sides other than the lower side abut on the pulling-in grooves 22, 24 and the breathable cushion body 14 is surrounded by these grooves 22, 24.

The second embodiment differs from the first embodiment only in the arrangement position of the breathable cushion body 14, in which the same operation and effect as those of the first embodiment can be obtained.

Third Embodiment

Figure 9:
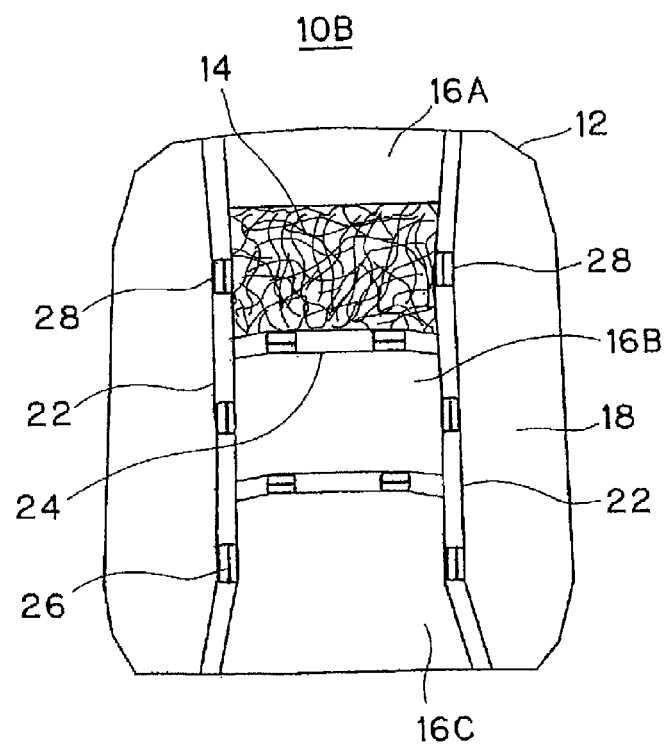
FIG. 9 is a front view of a seat pad according to a third embodiment.

FIG. 9 shows a seat pad 10B according to a third embodiment. This embodiment differs from the first embodiment in a point that the breathable cushion body 14 is provided in the upper section 16A of the main part 16 instead of being provided in the intermediate section 16B of the main part 16.

That is, the breathable cushion body 14 is provided in the upper section 16A of the main part 16, specifically, provided in a surface part of the upper section 16A other than an upper end part. The breathable cushion body 14 has an approximately rectangular shape, and is provided along the pulling-in grooves 22, 24 in a state where three sides of the periphery, which are a lower side and right and left both sides, abut on the pair of right and left vertical pulling-in grooves 22, 22 and the one horizontal pulling-in groove 24 in the upper side so as to communicate thereto over the entire length. That is, the breathable cushion body 14 is formed so that three sides other than the upper side abut on the pulling-in grooves 22, 24 and the breathable cushion body 14 is surrounded by these grooves 22, 24.

The third embodiment differs from the first embodiment only in the arrangement position of the breathable cushion body 14, in which the same operation and effect as those of the first embodiment can be obtained.

Fourth Embodiment

Figure 10:
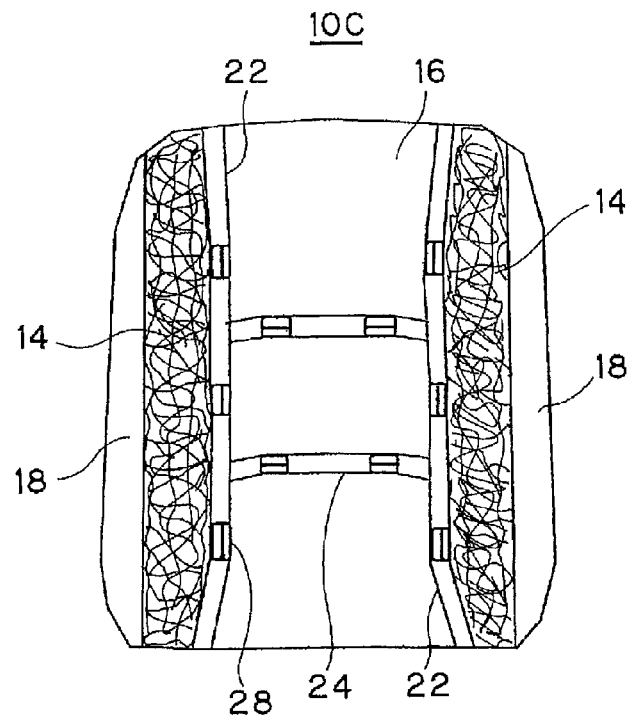
FIG. 10 is a front view of a seat pad according to a fourth embodiment.

FIG. 10 shows a seat pad 10C according to a fourth embodiment. This embodiment differs from the first embodiment in a point that the breathable cushion bodies 14 are provided in the right and left side parts 18, 18 instead of being provided in the intermediate section 16B of the main part 16.

That is, the breathable cushion bodies 14 are respectively provided in the right and left side parts 18, 18, which are respectively provided in surface parts of the right and left side parts 18, 18 other than pad side edges over the entire height direction. Each cushion body 14 is provided along the vertical pulling-in groove 22 in a state where one side on an inner side in the seat width direction in the periphery abuts on the vertical pulling-in groove 22 which demarcates the corresponding side part 18 so as to communicate thereto over the entire length.

The fourth embodiment differs from the first embodiment only in the arrangement position of the breathable cushion body 14, in which the same operation and effect as those of the first embodiment can be obtained.

Fifth Embodiment

Figure 11:
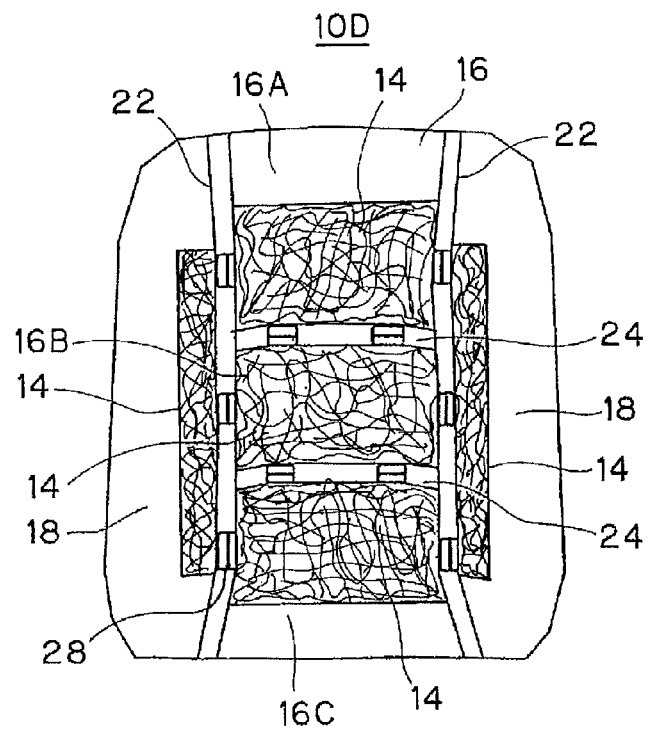
FIG. 11 is a front view of a seat pad according to a fifth embodiment.

FIG. 11 shows a seat pad 10D according to a fifth embodiment. This embodiment differs from the first embodiment in a point that the breathable cushion bodies 14 are provided not only in intermediate section 16B of the main part 16 but also in the lower section 16C, the upper section 16A and the right and left side parts 18, 18.

That is, the breathable cushion bodies 14 are provided also in the lower section 16C in the same manner as the second embodiment and the upper section 16A in the same manner as the third embodiment in addition to the arrangement of the first embodiment. The breathable cushion bodies 14 are also provided in the right and left side parts 18, 18 respectively, which are provided in the central part other than both upper and lower end portions in the height direction of each side part 18 in the embodiment, which is different from the fourth embodiment. Each breathable cushion body 14 is provided in a state of abutting on at least one of the vertical pulling-in groove 22 and the horizontal pulling-in groove 24 so as to communicate thereto.

Other structures in the fifth embodiment are the same as those of the first embodiment, in which the same operation and effect as those of the first embodiment can be obtained. As shown in the second to fifth embodiments, the arrangement position of the breathable cushion body 14 is not particularly limited as long as the breathable cushion body 14 is provided in at least part of the pad surface.

Sixth Embodiment

Figure 12:
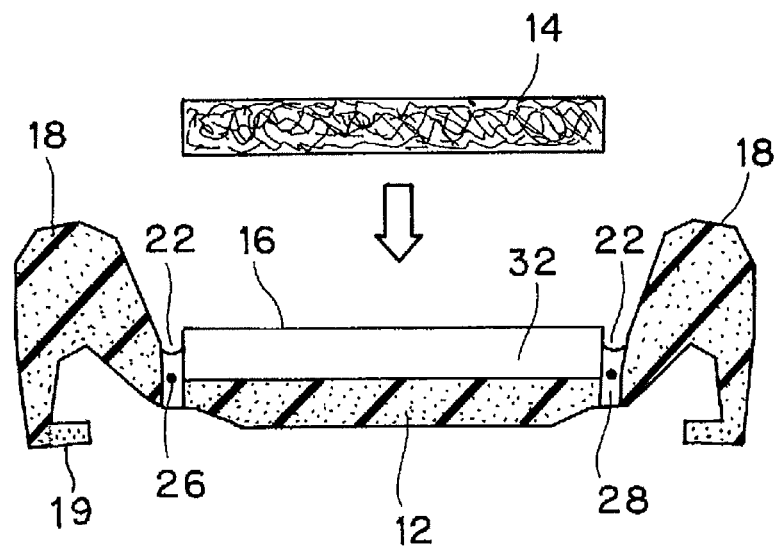
FIG. 12 is an exploded cross-sectional view of a seat pad according to a sixth embodiment.
Figure 13:
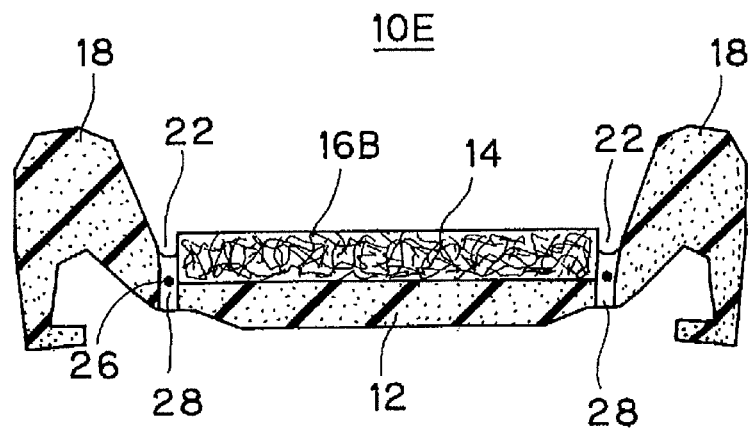
FIG. 13 is a cross-sectional view of the seat pad according to the sixth embodiment.

FIG. 12 and FIG. 13 show a seat pad 10E according to a sixth embodiment. The embodiment differs from the first embodiment in a point that the breathable cushion body 14 is set after the pad body 12 is foam-molded instead of laminating and integrally forming the breathable cushion body 14 by the foam molding of the pad body 12.

That is, the pad body 12 is foam-molded in advance with a concave housing part 32 for housing the breathable cushion body 14 provided as shown in FIG. 12 in the embodiment. Then, the breathable cushion body 14 is arranged in the housing part 32, thereby forming the seat pad 10E. Accordingly, the infiltration suppression sheet 30 is not provided on the reverse side of the breathable cushion body 14 in the embodiment as shown in FIG. 13. The breathable cushion body 14 may be provided in the housing part 32 by being bonded to the pad body 12 using an adhesive, or may be provided in the housing part 32 without using the adhesive.

Other structures in the sixth embodiment are the same as those of the first embodiment. As described above, air can go in and out of the breathable cushion body 14 on the pad surface side through the locking holes 28 by using the pulling-in grooves 22, 24 as the conduits by using the locking holes 28 as vent holes in the same manner as the first embodiment also when the breathable cushion body 14 is set afterward. Accordingly, the breathability of the seat pad 10 can be improved and the stuffiness when seated can be reduced effectively.

Other Embodiments

The cases of back pads as the backrest parts have been explained in the above embodiments, however, the present invention can be also applied to a seat cushion pad for supporting buttocks of an occupant as a seated person in the same manner.

Some embodiments of the present invention have been explained as the above. These embodiments have been cited as examples and are not intended to limit the scope of the invention. These novel embodiments can be achieved in other various forms, and various omissions, replacements and modifications may occur within a scope not departing from the gist of the invention. These embodiments and modifications thereof are included in the scope and the gist of the invention as well as are included in inventions described in claims and equivalents thereof.

INDUSTRIAL APPLICABILITY

The seat pad according to the present invention can be used for seats of various kinds of vehicles such as cars and railway trains as well as seats of boats and aircraft.

REFERENCE SIGNS LIST

10, 10A to 10E: seat pad, 12: pad body, 14: breathable cushion body, 20: skin material, 22: vertical pulling-in groove, 24: horizontal pulling-in groove, 26: wire, 28: locking hole, 30: infiltration suppression sheet

The invention claimed is:

1. A seat pad comprising:
a pad body formed of a foam resin molding;
a breathable cushion body formed of a three-dimensional net structure made of linear bodies and provided in a pad surface side of the pad body,
wherein the pad body includes a pulling-in groove provided on the pad surface for pulling in a skin material, a wire embedded along the pulling-in groove, and a locking hole provided in the pulling-in groove and exposing a part of the wire,
the locking hole is provided as a through hole piercing the pad body to a pad reverse side in the pulling groove, and the breathable cushion body is provided so that a side surface thereof abuts on the pulling-in groove so as to communicate thereto,
wherein the breathable cushion body is laminated on and integrally formed with the pad surface side by foam molding of the pad body,
wherein an infiltration suppression sheet for preventing infiltration of a foam raw material into the breathable cushion body at the time of the foam molding is provided in a reverse side of the breathable cushion body as well as on a boundary surface between the breathable cushion body and the pad body.

2. A seat pad comprising:
a pad body formed of a foam resin molding; and
a breathable cushion body formed of a three-dimensional net structure made of linear bodies and provided on a pad surface side of the pad body,
wherein the pad body includes a pulling-in groove provided on the pad surface for pulling in a skin material, a wire embedded along the pulling-in groove, and a locking hole provided in the pulling-in groove and exposing a part of the wire,
the locking hole is provided as a through hole piercing the pad body to a pad reverse side in the pulling groove, the locking hole being configured to act as an air conduit, and the breathable cushion body is provided so that a side surface thereof abuts on the pulling-in groove so as to communicate thereto,
wherein the pad body is foam-molded with a housing part provided on the pad surface side, and
the breathable cushion body is arranged in the housing part.

* * * * *